United States Patent
Aschauer et al.

(10) Patent No.: US 11,206,147 B2
(45) Date of Patent: Dec. 21, 2021

(54) METHOD AND APPARATUS FOR GENERATING A CRYPTOGRAPHIC TIME STAMP FOR A DIGITAL DOCUMENT ON A MAJORITY BASIS

(71) Applicant: Siemens Aktiengesellschaft, Munich (DE)

(72) Inventors: Hans Aschauer, Munich (DE); Steffen Fries, Baldham (DE); Dominik Merli, Mertingen (DE)

(73) Assignee: SIEMENS AKTIENGESELLSCHAFT

( * ) Notice: Subject to any disclaimer, the term of this patent is extended or adjusted under 35 U.S.C. 154(b) by 45 days.

(21) Appl. No.: 16/627,059

(22) PCT Filed: Jun. 27, 2018

(86) PCT No.: PCT/EP2018/067284
§ 371 (c)(1),
(2) Date: Dec. 27, 2019

(87) PCT Pub. No.: WO2019/007783
PCT Pub. Date: Jan. 10, 2019

(65) Prior Publication Data
US 2020/0127860 A1     Apr. 23, 2020

(30) Foreign Application Priority Data
Jul. 5, 2017 (EP) .................................... 17179823

(51) Int. Cl.
*H04L 9/32* (2006.01)
(52) U.S. Cl.
CPC .......... *H04L 9/3297* (2013.01); *H04L 9/3242* (2013.01)

(58) Field of Classification Search
CPC ....... H04L 9/3297; H04L 9/3242; H04L 9/12; H04L 9/3236; H04L 9/3247; H04L 2209/38
See application file for complete search history.

(56) References Cited

U.S. PATENT DOCUMENTS

2015/0295720 A1* 10/2015 Buldas .................. H04L 9/3263
                                                                  713/176
2019/0305937 A1* 10/2019 Baykaner .............. H04L 9/3236

OTHER PUBLICATIONS

S. H. Admed, "Digital Timestamping: A Web-Based Anonymous Distributed Solution", Aug. 6, 2008, The International Journal of Intelligent Computing and Information Sciences, vol. 6, pp. 1-19. (Year: 2008).*

(Continued)

*Primary Examiner* — Nelson S. Giddins
(74) *Attorney, Agent, or Firm* — Schmeiser, Olsen & Watts LLP

(57) ABSTRACT

A method for producing a cryptographic timestamp for a digital document using multiple time servers is provided. In the method, a nonce value is produced and a current hash value is formed from the nonce value and the digital document. Then, a time server is repeatedly selected, the current hash value is transmitted to the selected time server, a response comprising a digital signature of the current hash value and a time indication is received by the selected time server, and an additional hash value is determined from the received response and used as the current hash value. The cryptographic timestamp for the digital document is formed from the nonce value and the multiple received responses. The method produces a tamperproof timestamp on a majority basis and is suitable for dating and protocolling in the field of automation and IoT.

14 Claims, 6 Drawing Sheets

(56) References Cited

OTHER PUBLICATIONS

A. Bonnecaze et al., "A Distributed Time Stamping Scheme", Sep. 3, 2005, CNRS-EUROCOM FRE2660, RR-05-140, pp. 1-6. (Year: 2005).*

Bonneacaze Alexis et al: "A Distributed Time Stamping Scheme", XP055438020, DOI: 10.1007/BF03253323 Gefunden im Internet: URL:http://alexis.bonnecaze.perso.luminy.univ-amu.fr/articles/sitis.pdf gefunden am Jan. 3, 2018; abstract; p. 2, right column, line 15—p. 5, left column, line 11; 2005.

Salsa20 https://en.wikipedia.org/wiki/Salsa20 Oct. 28, 2019.

Certificate Transparency—RFC6962 (siehe http://www.ietf.org/rfc/rfc6962.txt)—Google Jun. 2013.

PCT International Search Report and Written Opinion of International Searching Authority dated Sep. 24, 2018 corresponding to PCT International Application No. PCT//EP2018/067284 filed Jun. 27, 2018.

Ahmed S H et al: "Digital Timestamping: A Web-Based Anonymous Distributed Solution", XP055438014, gefunden im Internet: URL:http://scholar.msa.edu.eg:92/sites/default/files/ehabemam/files/timestamping_paper-ehab_emam.pdf, gefunden am Jan. 3, 2018, abstract, p. 10, line 7—p. 13, line 2; figure 3; 2008.

Standard IEC 62351-8; https://webstore.iec.ch/publication/6911; 2011.

\* cited by examiner

METHOD AND APPARATUS FOR GENERATING A CRYPTOGRAPHIC TIME STAMP FOR A DIGITAL DOCUMENT ON A MAJORITY BASIS

CROSS-REFERENCE TO RELATED APPLICATIONS

This application claims priority to PCT Application No. PCT/EP2018/067284, having a filing date of Jun. 27, 2018, which is based off of EP Application No. 17179823.4, having a filing date of Jul. 5, 2017, the entire contents both of which are hereby incorporated by reference.

FIELD OF TECHNOLOGY

The following relates to a method and an apparatus for generating a cryptographic time stamp for a digital document using a plurality of time servers.

BACKGROUND

In a digital communication scenario, it may be necessary to provide proof that information, such as a digital document, was present at a particular time and has not changed since.

A service which receives a digital document or a cryptographic hash value of the digital document, links it to a current time specification and creates a digital signature therefrom is known. The digital signature can be used, in combination with the time specification, as the required proof. For this purpose, it is necessary for the entity providing the proof and the entity, to which the proof is provided, to each trust the same service.

It is also known practice to publish the digital document or the cryptographic hash value in a suitable manner, for example in a daily newspaper, or to store it in a blockchain protected from subsequent manipulations by proof-of-work or a similar mechanism.

A method for roughly temporally synchronizing clocks, in which a client obtains time specifications from a plurality of time servers and receives cryptographic proof if one of the time servers provides an incorrect value (https://roughtime-.googlesource.com/roughtime), is also known.

Security protocols for the NTP or PTP protocol using time-server-specific keys are also known.

The restriction of the effective range of certificates by means of area-of-responsibility identifiers according to IEC 62351-8 is also known.

Certificate transparency methods according to RFC6962, which allow the issue of a certificate to be temporally tracked on the basis of Merkle hash trees and a central logging service, are also known.

SUMMARY

Against this background, an aspect relates to improving the generation of cryptographic time stamps for digital documents.

Accordingly, a method for generating a cryptographic time stamp for a digital document using a plurality of time servers is proposed. The proposed method comprises: a) generating a nonce value and determining a current hash value by applying a predetermined hash function to the nonce value and to the digital document; b) repeatedly carrying out the following steps: b1) selecting one of the plurality of time servers; b2) transmitting the current hash value to the selected time server; b3) receiving a response which is created by the selected time server and comprises a digital signature of the current hash value and a time specification; b4) determining a further hash value by applying the predetermined hash function to the received response, and b5) using the further hash value as the current hash value; and c) forming the cryptographic time stamp for the digital document from the nonce value and the plurality of received responses.

A digital document may be a data sequence of any desired length, for example a text file, a log file or a binary file, which is a digital representation of a document, for example a certificate, a contract or a log. Examples of a digital document are a digital contract, a log of operator decisions in a technical installation or a machine contract between a plurality of automation devices in an Internet-of-Things network.

A cryptographic time stamp may be a data sequence which can be used to unequivocally check, by means of cryptographic operations, whether the digital document was present in unchanged form at a time denoted by the cryptographic time stamp. A cryptographic time stamp can be illustrated as a digital representation of a stamp or seal impression.

A time server in the sense of the proposed method is a unit which is set up to receive a value of a predetermined width, for example a nonce value, and to transmit a response in response to this, wherein the response is a data sequence which comprises a digital signature of the received value and a time specification. One example of a time server which can be used with the proposed method is a server which implements the Roughtime protocol.

A respective time server can be implemented in hardware or software. The plurality of time servers may be distributed spatially, in a cloud and, in particular, over different regions or jurisdictions.

A nonce value is, in particular, a value of a predetermined width from a predetermined range of values, in particular a very large range of values, which is determined in a random or pseudorandom manner in such a manner that it is sufficiently unlikely that the same nonce value will be used several times. Alternatively, a nonce value can also be a value of a counter which is incremented by a predetermined amount each time a nonce value is generated in such a manner that it is used only once at least during a lifetime of keys used to generate the cryptographic time stamps.

A hash function is a function which maps an input quantity to an output quantity. The input quantity may comprise elements of different lengths, for example data sequences, such as digital documents of any desired length. The output quantity comprises hash values of a predetermined width. In particular, the calculation of the hash value for a given element in the input quantity on the basis of the hash function may require a smaller amount of computing effort, in particular an amount of computing effort which is smaller by many orders of magnitude, than the determination of an element in the input quantity which matches a predefined hash value. One example of the predetermined hash function is SHA256. Another example of the predetermined hash function is a hash function based on Salsa20.

The hash function may have, in particular, the property of collision resistance. Collision resistance is present, in particular, if it is practically unfeasible to determine two elements in the input quantity which are mapped to the same hash value by the hash function.

The predetermined width of the values to be received by the time server, the predetermined width of the nonce value and the predetermined width of the hash values of the hash function can be the same, in particular.

A time specification is, in particular, a data sequence which specifies at least a date and a time. One example of a time specification is a Unix time stamp.

Applying the hash function to a plurality of elements, for example to the nonce value and to the digital document, should be understood as meaning, in particular, the fact that the plurality of elements are linked, for example concatenated or attached to one another, and the hash function is applied to the result of the linking process.

Forming the cryptographic time stamp from a plurality of elements, that is to say from the nonce value and the plurality of received responses, should likewise be understood as meaning, in particular, the formation of a data sequence by concatenating the respective elements.

According to the proposed method, a first hash value is first of all formed, in particular, from a result of a document to be provided with a time stamp and a nonce value. A response is then received from a time server, for example a Roughtime server, on the basis of the first hash value. A hash value is formed again from the response from the time server and a response is received from a further time server on the basis of the further hash value etc. In this manner, a hash chain can be formed from signed time specifications of the plurality of time servers and can be used as the time stamp.

The hash chain is advantageously protected from subsequent manipulations.

As a result of the steps of the proposed method, an existing infrastructure comprising the plurality of time servers, which is provided for time information or time synchronization, for example a Roughtime infrastructure, can therefore be advantageously used to securely time-stamp a digital document.

The cryptographic time stamp can be advantageously formed, using the proposed method, as a majority consensus of a plurality of time servers over the time at which the document to be stamped was presented to the respective time servers. As a result, demands imposed on the trustworthiness of an individual time server are reduced and it is not necessary, in particular, for an apparatus which generates the time stamp and an apparatus which checks the time stamp to trust the same time server. In addition, malfunctions of an individual time server can be easily discovered and proven.

According to one embodiment, the digital signature comprises the time specification and/or is formed by signing the current hash value and the time specification.

One example of a digital signature of the hash value, which can comprise the time specification as part of the digital signature, is a digital signature according to ITU-T X.509. Alternatively, it is possible to use a digital signature which does not comprise a time specification as part of the digital signature. In this case, the digital signature may be a digital signature which is formed by signing a result of a linking process, for example a concatenation, of the hash value and the time specification.

The time specification is advantageously cryptographically protected by integrating the time specification in the digital signature or by signing the time specification, in particular.

According to another embodiment, the cryptographic time stamp comprises the nonce value and a sequence of the plurality of received digital signatures and of the plurality of received time specifications.

The time specifications can be integrated in the digital signatures or can be included in the time stamp separately from the digital signatures.

According to another embodiment, in each step b4), the determination of a further hash value comprises generating a further nonce value and is carried out by applying the predetermined hash function to the further nonce value and to the received response. The cryptographic time stamp for the digital document is formed from the plurality of nonce values and the plurality of received responses. The cryptographic time stamp comprises a sequence of the plurality of nonce values, of the plurality of received digital signatures and of the plurality of received time specifications.

By virtue of each further hash value being formed not only from a respective received response but from the respective received response and a further nonce value, the demands imposed on collision resistance of the hash function are advantageously reduced by such inclusion of the further nonce values in the hash chain.

According to another embodiment, a time server is identified as unreliable if a time specification included in a response created by the time server does not satisfy a predefined consistency criterion.

The consistency criterion may be a guideline which governs, for example, the amount by which the time specifications provided at substantially the same time by different time servers can differ from one another.

Unreliable time servers can be identified at different points in the proposed method, for example in step b3), that is to say as soon as a response is received from an unreliable time server, for example by comparing the response with the responses received until then on the basis of the consistency criterion. In this case, the response from the time server identified as unreliable can be rejected and steps b1) to b3) can be repeated with another selected time server. This advantageously makes it possible to create a reliable cryptographic time stamp even if one of the plurality of time servers is unreliable.

Alternatively, the identification can be carried out in step c), that is to say when forming the cryptographic time stamp from the plurality of received responses, by comparing each response with all received responses on the basis of the consistency criterion.

According to another embodiment, the proposed method comprises: checking the time specifications included in the cryptographic time stamp formed in step c) using a predefined consistency criterion, and using the cryptographic time stamp as the trustworthy cryptographic time stamp for the digital document if all of the time specifications satisfy the predefined consistency criterion, or using the cryptographic time stamp as proof of unreliability of at least one of the selected time servers if at least one of the time specifications does not satisfy the predefined consistency criterion.

Using the cryptographic time stamp as the trustworthy cryptographic time stamp for the digital document means, in particular, that the cryptographic time stamp is stored as part of the digital document, in a manner linked to the digital document or separately from the digital document in such a manner that it is possible to check, at a later time, on the basis of the cryptographic time stamp, that the digital document was present at the time specified by the cryptographic time stamp. The first of the plurality of time specifications included in the cryptographic time stamp or an average value of the plurality of time specifications can be used, for example, as the time specified by the cryptographic time stamp.

If one of the time specifications included in the cryptographic time stamp does not satisfy the consistency criterion, the cryptographic time stamp can be used, in particular, as proof of the unreliability of the associated time server which created the time specification which does not comply with the consistency criterion. The unreliable time server can be uniquely identified via the digital signature generated by it. The proof can be published, for example, in a blog, in a blockchain or according to any desired predefined protocol. Unreliable time servers can therefore be advantageously identified and then excluded from participating in the proposed method, with the result that the trust in the infrastructure comprising the plurality of time servers is increased further.

According to another embodiment, the predetermined consistency criterion comprises the condition that a temporal sequence of respective time specifications corresponds to a sequence of the respective selection of the corresponding time servers and/or corresponds to a sequence of the respective time specifications in the cryptographic time stamp.

In other words, the predetermined consistency criterion according to the present embodiment may require a monotonous increase in the time specifications provided by the time servers in succession. This enables a very simple plausibility check of the consistency of the time specifications.

According to another embodiment, the predetermined consistency criterion comprises the condition that a time specification does not differ from at least one of the plurality of time specifications by more than a predetermined first tolerance threshold.

For example, the condition may be that a respective time specification does not differ from a preceding time specification in a sequence of the time specifications in the cryptographic time stamp by more than the predetermined first tolerance threshold. Alternatively, the condition may be that the respective time specification does not differ from the first of the time specifications or from an average value of some or all of the time specifications in the cryptographic time stamp by more than the predetermined first tolerance threshold.

The first tolerance threshold can be advantageously used to specify a maximum permissible deviation of the time specifications of the time servers from one another. The maximum permissible deviation can be selected depending on the requirements of the specific application and can be at most 10 minutes, for example.

According to another embodiment, the proposed method comprises: measuring a local time before a respective step b4); determining the further hash value in a respective step b4) by applying the predetermined hash function to the received response and to the measured local time; also forming the cryptographic time stamp in step c) from the local times measured in steps b4). In this case, the cryptographic time stamp comprises the nonce value and a sequence of the plurality of received digital signatures, of the plurality of received time specifications and of the plurality of measured local times. The predetermined consistency criterion comprises the condition that a difference between two of the time specifications in each case does not differ from a difference between the corresponding two of the measured local times by more than a predetermined second tolerance threshold.

The local time is, in particular, a time of a local timer, such as a system clock of an apparatus which carries out the proposed method. It may be a synchronized, absolute time or a non-synchronized, relative time, for example a time since switching on the apparatus which carries out the proposed method. Including the local times in the cryptographic time stamp makes it possible to track at later times how much time has elapsed between receiving two time specifications which form the cryptographic time stamp. The condition of the predetermined consistency criterion according to the present embodiment can specify that the elapsed time should correspond substantially to a difference between the two time specifications which is caused, for example, by signal transmission and a processing time. The predetermined second tolerance threshold may be selected, in particular, to be lower than the first tolerance threshold. This makes it possible to check the time specifications provided by the plurality of time servers for consistency in an extremely precise manner, and this consistency can be tracked at a later time by checking the local times and digital signatures included in the cryptographic time stamp.

According to another embodiment, one of the plurality of time servers is selected in the respective steps b1) according to a predefined order or randomly.

If all of the plurality of time servers are selected in succession according to a predefined order, for example, all time servers can be taken into account, in particular, and a maximum trustworthy cryptographic time stamp can therefore be advantageously created. If, however, the number of time servers available for the proposed method becomes very large, the length of the cryptographic time stamp can be limited to a predetermined length by randomly selecting some of the plurality of time servers in order to advantageously save computing time. In variants, the same time server can also be selected several times in the course of repeatedly carrying out step b1) in the proposed method and consistency of the time specifications provided by the time server can be advantageously checked in this manner, that is to say it is possible to check, in particular, whether the time difference between two time specifications provided by the same time server corresponds substantially or exactly to the time elapsed between respectively selecting the same time server.

According to another embodiment, the proposed method comprises: selecting a plurality of the plurality of time servers in step b1); transmitting the current hash value to each of the plurality of selected time servers in step b2); receiving a respective response from each of the selected time servers in step b3), which response respectively comprises a digital signature of the current hash value and a time specification; and determining the further hash value in step b4) by applying the predetermined hash function to the received responses from the plurality of selected time servers.

In the proposed method according to the present embodiment, a plurality of time servers are queried in a parallel manner and the cryptographic time key is accordingly formed as a hash chain from blocks of responses from a plurality of time servers in each case. A large number of time servers can be efficiently queried by means of such parallelization. The period of time needed to create a cryptographic time stamp using a large number of time servers can therefore be advantageously reduced.

According to another embodiment, in the proposed method, in a respective step b3), the response also comprises an identifier describing an area of validity of the digital signature, and the digital signature is a digital signature of a combination of the current hash value and the identifier describing the area of validity of the digital signature. In this case, the cryptographic time stamp comprises the nonce value and a sequence of the plurality of received digital signatures, of the plurality of received time specifications and of the plurality of received identifiers.

In particular, the identifier describing the area of validity of the digital signature may be a digital specification which describes the fact that the digital signature uses the time specification to confirm the time at which the signed data were present, but does not make any statement on the validity of the signed data. This makes it possible to prevent the digital signatures of the plurality of time servers being misused or misinterpreted for purposes other than for time-stamping. The identifier describing the area of validity of the digital signature can be integrated in the digital signature using a scope extension or can be included in the response as a separate data element. If the identifier describing the area of validity of the digital signature is included in the response as a separate data element, the digital signature can be a digital signature which is formed by signing the current hash value and the identifier. The identifier may be an AoR (Area of Responsibility) identifier according to IEC 62351-8.

A computer program product (non-transitory computer readable storage medium having instructions, which when executed by a processor, perform actions) which causes the method explained above to be carried out on a program-controlled device is also proposed.

A computer program product, for example a computer program means, can be provided or delivered, for example, as a storage medium, for example a memory card, a USB stick, a CD-ROM, a DVD, or else in the form of a downloadable file from a server in a network. This can be carried out, for example in a wireless communication network, by transmitting a corresponding file containing the computer program product or the computer program means.

Another aspect proposes an apparatus for generating a cryptographic time stamp for a digital document using a plurality of time servers. The apparatus has: a) a first unit for generating a nonce value and for determining a current hash value by applying a predetermined hash function to the nonce value and to the digital document; b) a second unit for repeatedly carrying out the following steps: b1) selecting one of the plurality of time servers; b2) transmitting the current hash value to the selected time server; b3) receiving a response which is created by the selected time server and comprises a digital signature of the current hash value and a time specification; b4) determining a further hash value by applying the predetermined hash function to the received response, and b5) using the further hash value as the current hash value; and c) a third unit for forming the cryptographic time stamp for the digital document from the nonce value and the plurality of received responses.

The embodiments and features described for the proposed method accordingly apply to the proposed apparatus.

The respective unit, for example the computing unit or the control unit, can be implemented in hardware and/or software. In the case of a hardware implementation, the respective unit may be in the form of an apparatus or part of an apparatus, for example in the form of a computer or a microprocessor or a control computer of a vehicle. In the case of a software implementation, the respective unit can be in the form of a computer program product, a function, a routine, part of a program code or an executable object.

One embodiment proposes an apparatus for logging operator decisions and/or machine decisions, which apparatus is set up to provide digital documents with cryptographic time stamps generated according to a proposed method, wherein the digital documents comprise logs of operator decisions and/or machine decisions.

The operator decisions may be, for example, decisions made by a human operator in a safety-critical installation, for example a signal box or a nuclear power plant.

A machine contract may be a document which documents, for example in an automation installation, an agreement between autonomous devices regarding the use or provision of production capacities or the like.

In the case of malfunctions or safety-critical incidents, it is possible, on the basis of the time stamps created using the proposed method, to advantageously track which operator or which automated process was causally to blame for the incident or the malfunction.

Further possible implementations of embodiments of the invention also comprise not explicitly mentioned combinations of features or embodiments described above or below with respect to the exemplary embodiments. In this case, a person skilled in the art will also add individual aspects as improvements or additions to the respective basic form of embodiments of the invention.

BRIEF DESCRIPTION

Some of the embodiments will be described in detail, with reference to the following figures, wherein like designations denote like members, wherein.

In the figures, identical or functionally identical elements have been provided with the same reference signs unless stated otherwise.

DETAILED DESCRIPTION

Figure 1:
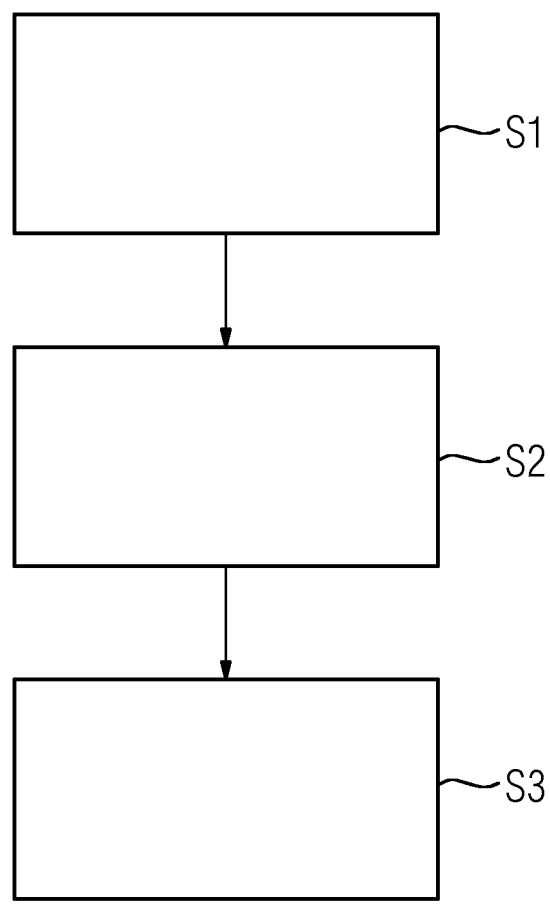
FIG. 1 illustrates steps of a proposed method.
Figure 2:
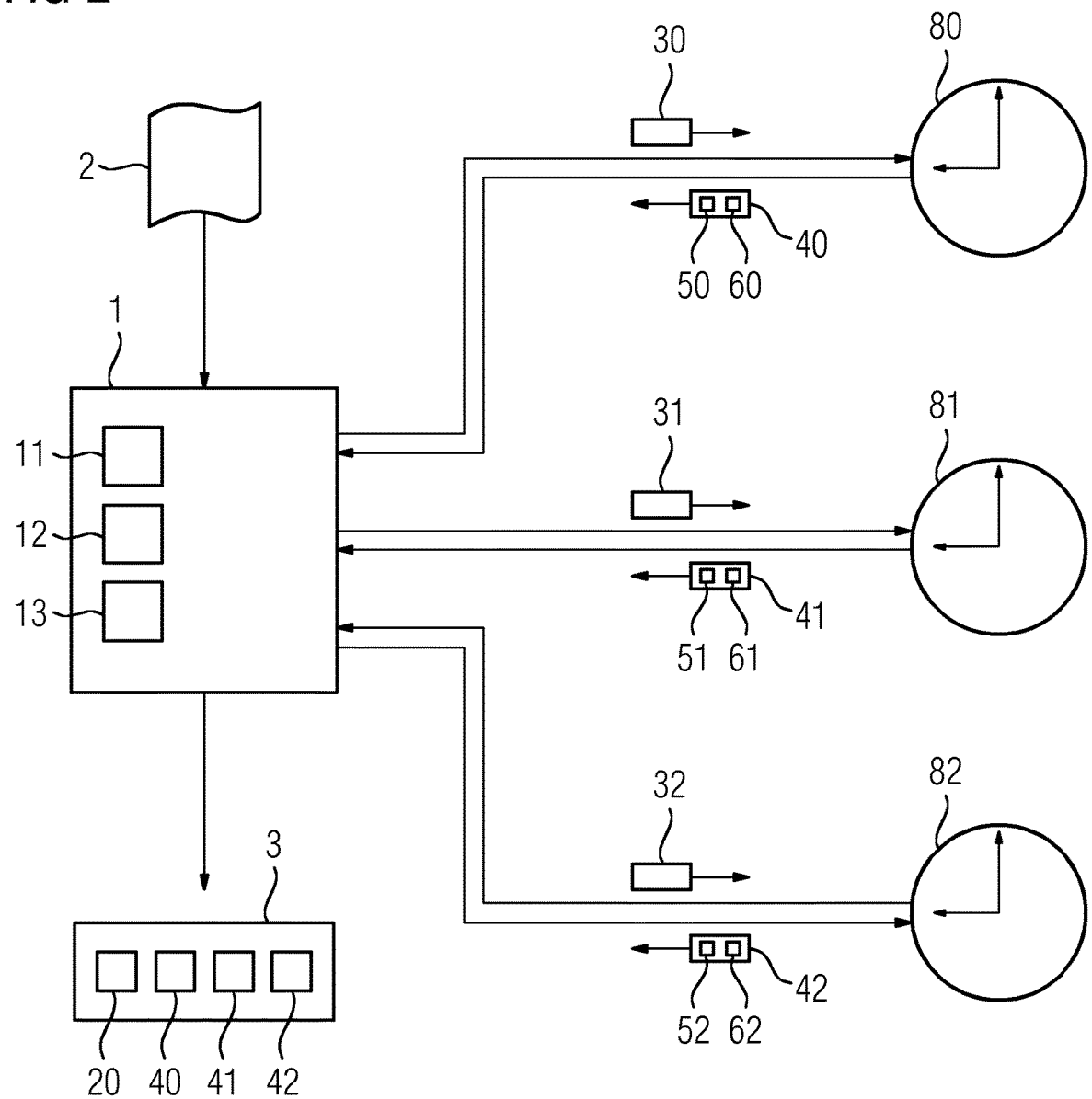
FIG. 2 illustrates the performance of a method according to a first exemplary embodiment.

A first exemplary embodiment is now described on the basis of FIG. 1 and FIG. 2. FIG. 1 illustrates the sequence of the steps of the proposed method. FIG. 2 shows a system in which the method according to the first exemplary embodiment is carried out.

The system from FIG. 2 comprises an apparatus 1 for generating a cryptographic time stamp—referred to as "time stamp apparatus 1" below. The time stamp apparatus 1 comprises a first unit 11, a second unit 12 and a third unit 13. The system from FIG. 2 also comprises a plurality of time servers 80, 81, and 82 which are Roughtime servers. The time stamp apparatus 1 can communicate with the time servers 80, 81, and 82 via a network (not shown) such as a LAN, a WAN or the public Internet. A digital document 2 is made available to the time stamp apparatus 1. The time stamp apparatus 1 generates a cryptographic time stamp 3 in accordance with the method according to the first exemplary embodiment, as described below.

In step S1 (cf. FIG. 1), the first unit 11 of the time stamp apparatus 1 generates a nonce value 20 by means of a pseudorandom number generator (not shown), concatenates the nonce value 20 with the document 2 and determines a first hash value 30, by applying a hash function h(x), for example an SHA-256 or Salsa20, to the result of the concatenation, as a hash value $h_0$ according to formula I:

$$h_0 = h(N|m) \qquad (I)$$

In this case, N is the nonce value 20, m is the document 2, and the vertical line denotes the concatenation operator, that is to say N|m denotes a concatenation of the nonce value N with the document m.

In step S2, the second unit 12 of the time stamp apparatus 1 selects the first time server 80 and transmits the first hash value 30, as the current hash value, to the first time server 80.

The time server 80 is a Roughtime server and deals with the hash value received from the time stamp apparatus 1 as a nonce value according to the Roughtime protocol. In other words, it is not necessary for the time server 80 to be specifically prepared to carry out the proposed method. For the function of the time server 80, it is therefore irrelevant that the value transmitted by the time stamp apparatus is a hash value 30 which transports hashed information relating to a document 2 to be stamped. According to the Roughtime protocol, in response to the transmission of the value 30, the time server 80 generates a time specification 50 denoting a current system time $t_0$ of the time server 80, concatenates the value 30 with the time specification 50 and signs the data sequence concatenated in such a manner in order to generate a digital signature 60. In other words, the time server 80 calculates the digital signature 60 as a digital signature $s_0$ according to the formula $s_0=\text{Sig}(h_0|t_0)$. The time server then transmits the response 40 comprising the time specification 50 and the digital signature 60 as a concatenated data sequence $t_0|s_0$.

The second unit 12 of the time stamp apparatus receives the response 40 from the first time server 80.

The second unit 12 then applies the hash function $h(x)$ to the received response and thus determines a second hash value 31 as a hash value $h_1$ according to the following formula II:

$$h_1=h(t_0|s_0)=h(t_0|\text{Sig}(h_0|t_0)) \tag{II}$$

where $t_0$ denotes the first time specification 50, $s_0$ denotes the first digital signature 60 and $h_0$ denotes the first hash value 30.

The second unit 12 then selects a second time server 81 and transmits the second hash value 31 obtained in such a manner to the second time server 81 and receives a response 41 comprising a second time specification 51 and a second digital signature 61, wherein the second digital signature 61 is a digital signature $s_1$ of the second hash value 31 and of the second time specification 51 according to the formula $s_1=\text{Sig}(h_1|t_1)$.

The second unit 12 then determines a third hash value 32 as a hash value $h_2$ according to formula III:

$$h_2=h(t_1|s_1)=h(t_1,\text{Sig}(h_1|t_1)) \tag{III}$$

In this case, $t_1$ is the second time specification 51, $s_1$ is the second digital signature 61, $h_2$ is the third hash value 32 and $h_1$ is the second hash value 31.

The second unit 12 selects a third time server 82 and transmits the third hash value 31 obtained in such a manner to the third time server 82 and receives a response 42 comprising a third time specification 52 and a third digital signature 62 of the third hash value 32 and of the third time specification 52.

The second unit 12 has therefore received three responses 40, 41, 42 from three time servers 80, 81, 82, wherein a respective response 40, 41, 42 respectively comprises a time specification 50, 51, 52 and a digital signature 60, 61, 62, and the respective digital signature 60, 61, 62 is a digital signature of a concatenation of an associated hash value 30, 31, 32 and an associated time specification 50, 51, 52.

In general terms, the hash values 30, 31, 32 and the digital signatures 60, 61, 62 are determined according to formulae IV-VI:

$$h_0=h(N|m) \tag{IV}$$

$$s_i=\text{Sig}(h_i|t_i), \text{ with } i \geq 0 \tag{V}$$

$$h_i=h(t_{i-1}|s_{i-1})=h(t_{1-1}|\text{Sig}(h_{1-1}|t_{1-1})), \text{with } i \geq 1 \tag{VI}$$

In this case, $h_i$ are the hash values 30, 31, 32 and $s_i$ are the digital signatures 60, 61, 62.

It is noted that a hash chain in is formed by the recursion in formula VI.

In step S3, the third unit 13 forms the cryptographic time stamp 3 for the digital document 2 from the nonce value 20 generated by the first unit 11 (N in formulae I and IV above) and the received responses 40, 41, 42. The cryptographic time stamp 3 is output by the time stamp apparatus 1 and the method according to the first exemplary embodiment ends.

Figure 3:
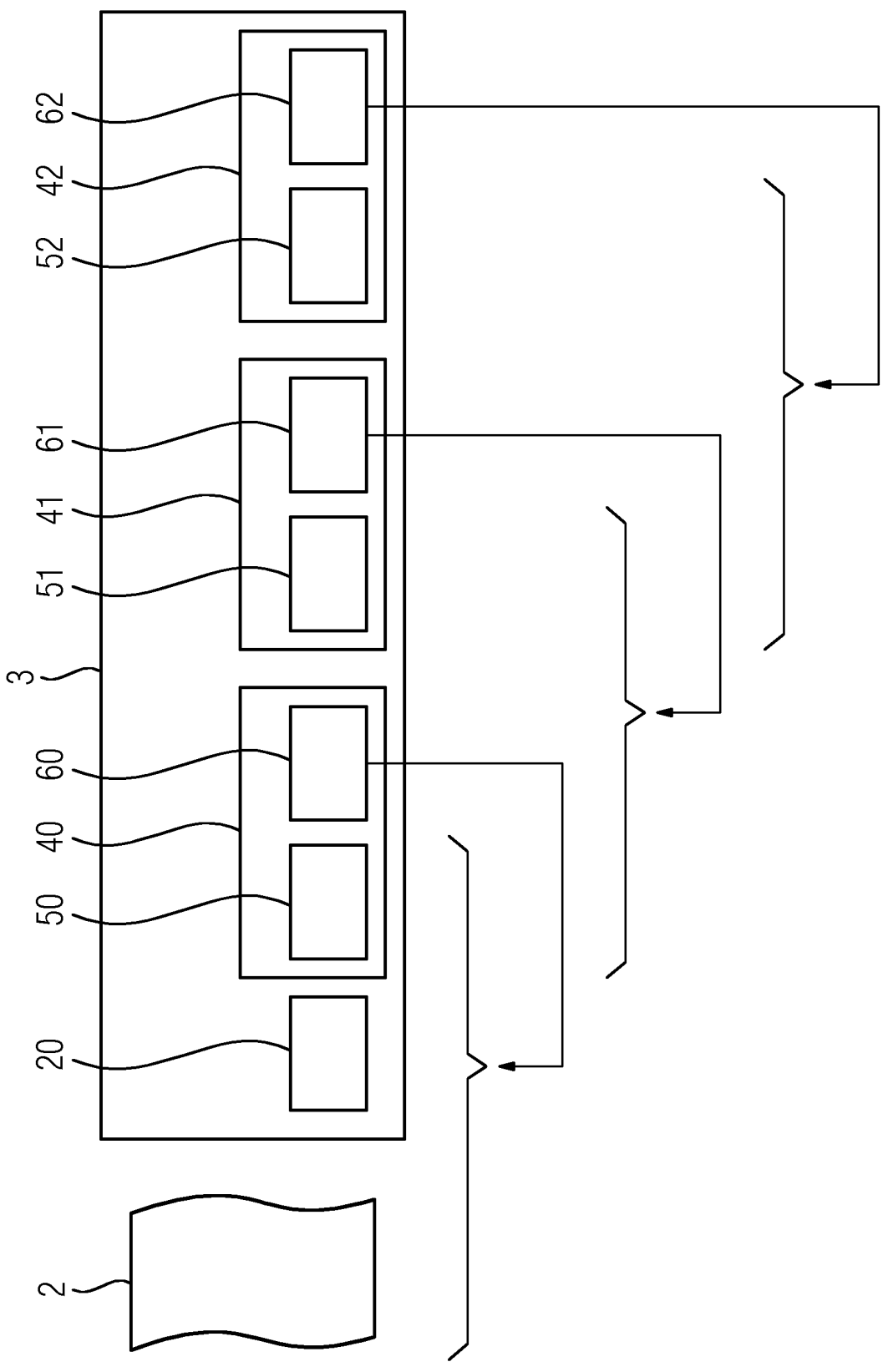
FIG. 3 shows a data structure of a cryptographic time stamp according to the first exemplary embodiment.

FIG. 3 shows the document 2 and the cryptographic time stamp 3 and illustrates the data structure thereof. The cryptographic time stamp 3 comprises the nonce value 20 (N in formulae I and IV) and the plurality of responses 40, 41, 42. Each of the responses 40, 41, 42 respectively comprises a time specification 50, 51, 52 and a digital signature 60, 61, 62. The arrows and curly brackets in FIG. 3 illustrate the data to which the respective digital signatures 60, 61, 62 relate. The first digital signature 60 is, according to formula V, a digital signature of the first hash value 30 (cf. FIG. 2), which was determined, according to formula IV, by applying the hash function to the document 2 and to the nonce value 20, and of the first time specification 50. The second digital signature 61 is, according to formula V, a digital signature of the second hash value 31, which was determined, according to formula VI, by applying the hash function to the first response 40, and of the second time specification 51. The third digital signature 62 is, according to formula V, a digital signature of the third hash value 32, which was determined, by means of formula VI, by applying the hash function to the second response 41, and of the third time specification 52. A hash chain which is protected from manipulation is produced by the illustrated back-references of the respective digital signatures in the respective responses to the hash values of the respectively previous responses.

It is noted that, according to the exemplary embodiment, the hash values 30, 31, 32 themselves are not part of the cryptographic time stamp 3 since they can be recalculated at any time for a given document 2 and a given time stamp 3, with its constituent parts of the nonce value 20 and responses 40, 41, 42, from these on the basis of the SHA256 hash function.

It is also noted that the nonce value 20 can also be omitted, but the nonce value 20 reduces the likelihood of collisions of the hash function and also advantageously prevents the content of the time stamp 3 being able to be predicted for a predefined time t for a predefined document 2.

In one development of the first exemplary embodiment, the time stamp apparatus 1 checks the time specifications 50, 51, 52 of the time stamp 3 on the basis of a predefined consistency criterion. In one variant of the development, the time stamp apparatus 1 checks whether the temporal sequence of the time specifications 50, 51, 52 corresponds to the order in which the corresponding time servers 80, 81, 82 were selected, that is to say the order in which the time specifications 50, 51, 52 occur in the time stamp 3. In another variant of the development, the time stamp apparatus 1 checks whether the time specifications 50, 51, 52 differ from one another by no more than a predetermined tolerance threshold of 10 minutes, for example, that is to say differ from an average value of the time specifications 50, 51, 52 or from the first time specification 50, for example. If one of the time specifications 50, 51, 52 is identified in these checks as being inconsistent with the time stamp 3, that is to say with the other time specifications 50, 51, 52 of the time stamp 3, the associated time server 80, 81, 82 from which the inconsistent time specification 50, 51, 52 was received is identified as unreliable. In this case, the time stamp apparatus 1 uses the time stamp 3 as the cryptographic proof of the unreliability of the unreliable time server. The time stamp apparatus 1 disseminates the time stamp 3 for this purpose, for example according to a peer-to-peer protocol, with the result that other time stamp apparatuses have the opportunity to take note of the cryptographic proof.

If the time stamp apparatus 1 has identified one of the time servers 80, 81, 82 as unreliable or if the time stamp apparatus 1 itself receives corresponding cryptographic proof of the unreliability of one of the time servers 80, 81, 82 via the peer-to-peer protocol, this results in the time stamp apparatus 1 not selecting the unreliable time server from the time servers 80, 81, 82 during repeated performance of the method.

If, in contrast, none of the time servers 80, 81, 82 has been identified as unreliable, the time stamp 3 is used as the time stamp for the digital document 2, as described below.

Figure 4:
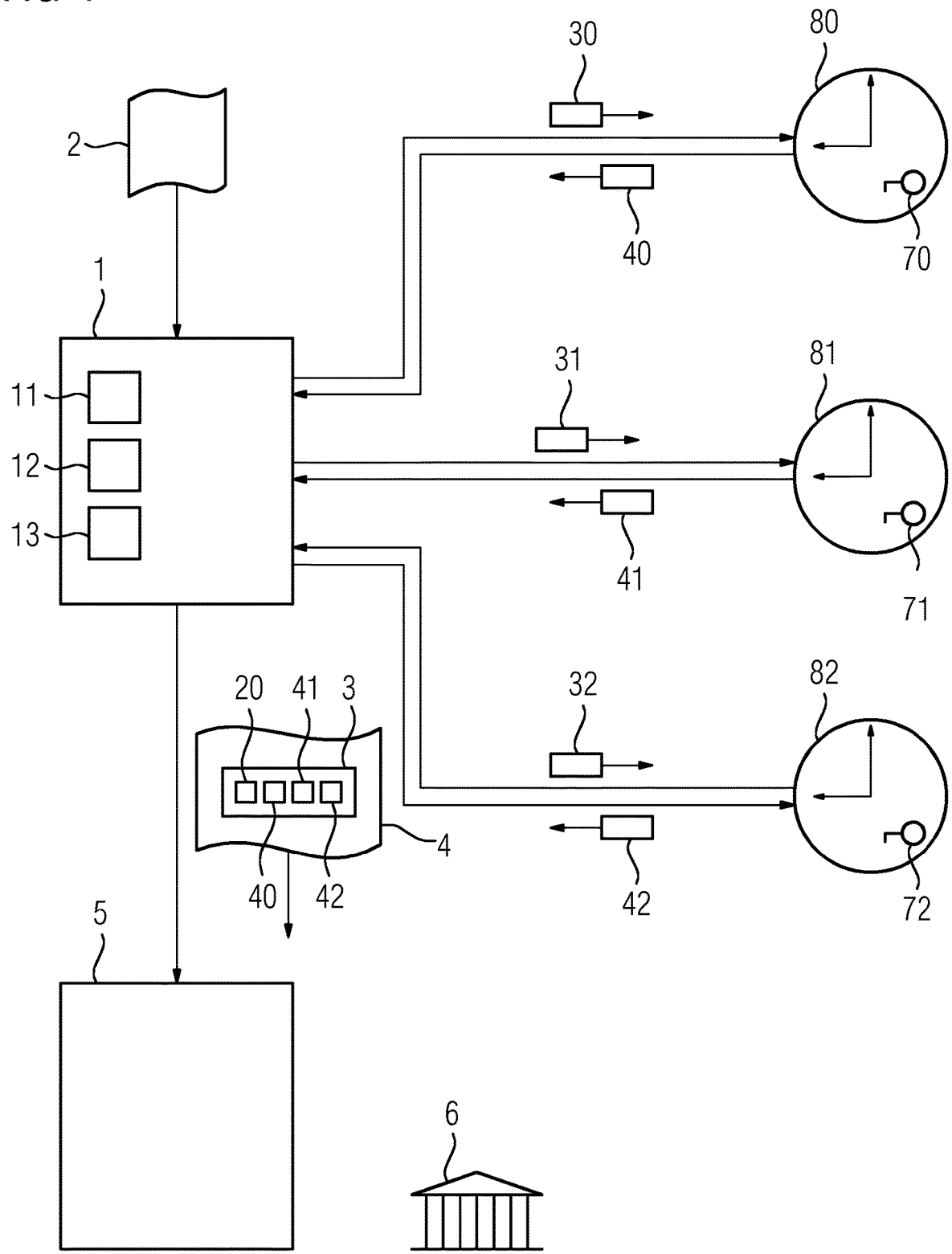
FIG. 4 illustrates a development of the first exemplary embodiment.

FIG. 4 shows another development of the first exemplary embodiment, in which a time-stamped digital document 4 is formed from the digital document 2 and the cryptographic time stamp 3 and is submitted, at any desired later time, to an apparatus 5 for checking time stamps, which apparatus 5 checks the time stamp 3 of the time-stamped digital document 4, as described below.

Each of the time servers 80, 81, 82 according to the development of the first exemplary embodiment in FIG. 4 has a private key 70, 71, 72 which is known exclusively to the respective time server 80, 81, 82. The time servers 80, 81, 82 use their respective private key 70, 71, 72 to generate the digital signatures 60, 61, 62 for the responses 40, 41, 42, as described above. A respective private key 70, 71, 72 is part of a respective public-private key pair, that is to say corresponding public keys (not shown) exist for the private keys 71, 72, 73 and can be used to check the digital signatures 60, 61, 62.

The apparatus 5 for checking time stamps which is shown in FIG. 4 checks the time stamp 3 of the time-stamped digital document 4, as shown in detail in FIG. 3, as follows: the apparatus 5 first of all calculates the hash value 30 according to formula IV from the document 2, which corresponds to a section of the time-stamped document 4 without the time stamp 3, and the nonce value 20 and uses this hash value as the current hash value.

The apparatus 5 then checks the first response 40 by checking whether the first digital signature 60 from the response 40 from the first time server 80 is a valid digital signature of a concatenation of the current hash value with the time specification 50. This check is carried out on the basis of the public key associated with the private key 70 of the first time server 80. The public key can be stored in the apparatus 5, thus resulting in a relationship of trust between the apparatus 5 and the time server 80. The public key may also be part of a certificate of the time server 80, which certificate is checked by the apparatus 5 for its part on the basis of the public key of a certification authority 6 with which it has a relationship of trust. If the digital signature 60 is not a valid digital signature of the first time server 80, the time stamp 3 is considered to be invalid. Otherwise, the apparatus 5 determines the second hash value 31 according to formula IV from the response 40.

The apparatus 5 then checks the further responses 41, 42 in a similar manner to the first response 40.

It is noted that it is advantageously not necessary for the apparatus 5 to know or trust all public keys of all time servers 80, 81, 82 involved in the creation of the time stamp 3. If the apparatus does not know or trust one of the public keys of one of the time servers 80, 81, 82, it cannot determine whether the associated digital signature 60, 61, 62 is valid or invalid, but can nevertheless continue with checking the time stamp and can determine the next current hash value from the response 40, 41, 42 comprising the digital signature 60, 61, 62. For a successful check of the time stamp 3, it is sufficient if the apparatus 5 knows at least one of the public keys of one of the time servers 80, 81, 82 and can verify at least one of the digital signatures 60, 61, 62 from the time stamp 3 as valid and does not verify any of the digital signatures 60, 61, 62 as invalid. Therefore, it is not necessary, in particular, for the checking apparatus 5 to trust all of the time servers 80, 81, 82 or the same time servers as the time stamp apparatus 3.

If the check has revealed that all digital signatures 60, 61, 62, for which the apparatus 5 knows and trusts the associated public keys 70, 71, 72, are valid, the apparatus 5 checks the time specifications 50, 51, 52 for consistency in the same manner as already described above for a development of the time stamp apparatus 1 when generating the cryptographic time stamp 3. If the time specifications 50, 51, 52 are consistent, the apparatus 5 determines that the time stamp is valid and, on the basis of the time specifications 50, 51, 52, determines a time at which the time-stamped document 4 was originally submitted for time stamping. In one variant, the average value of the time specifications 50, 51, 52 is determined as the time, and the time of the first time specification 50 is determined in another variant.

Figure 5:
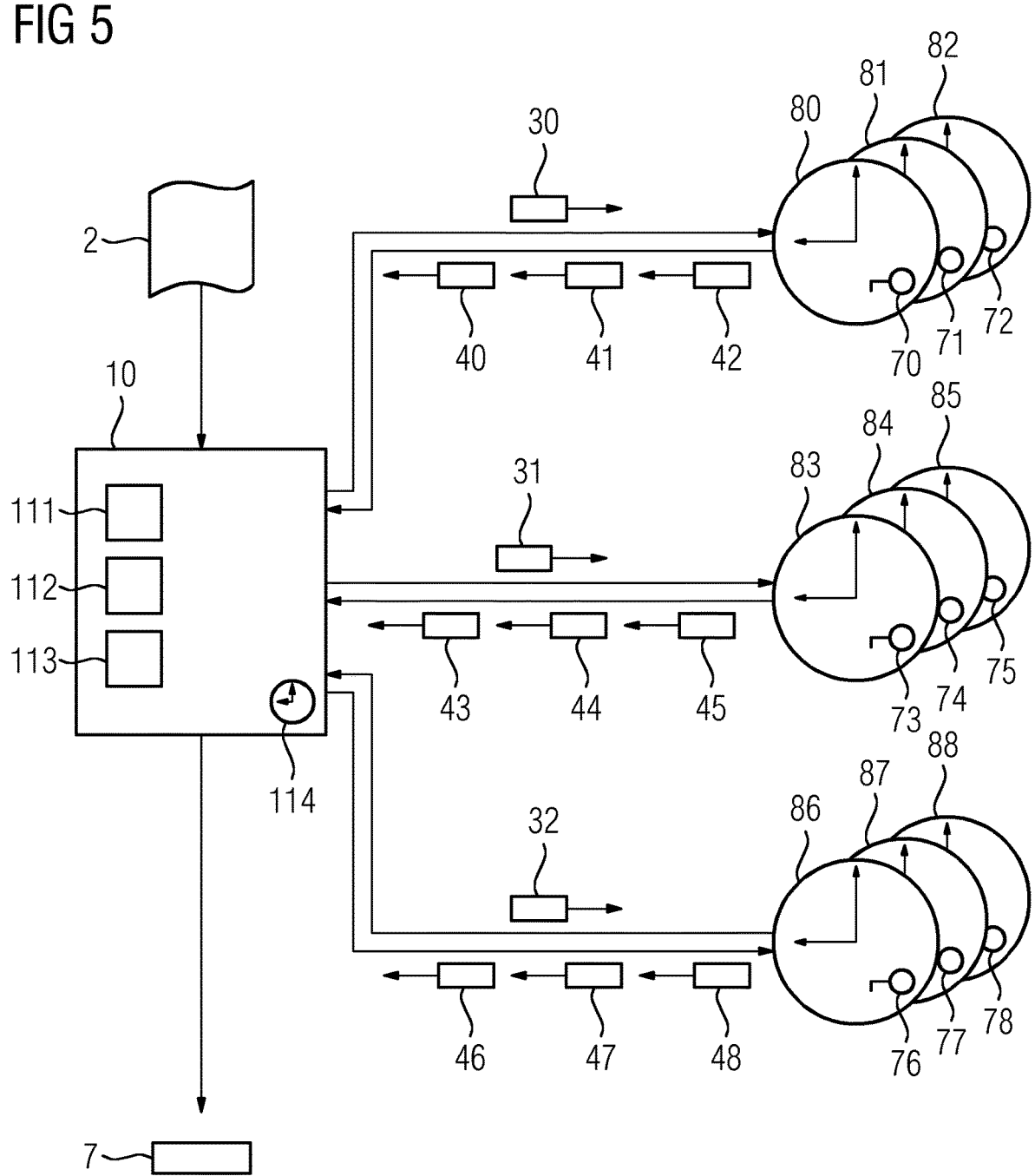
FIG. 5 illustrates the performance of a method according to a second exemplary embodiment.
Figure 6:
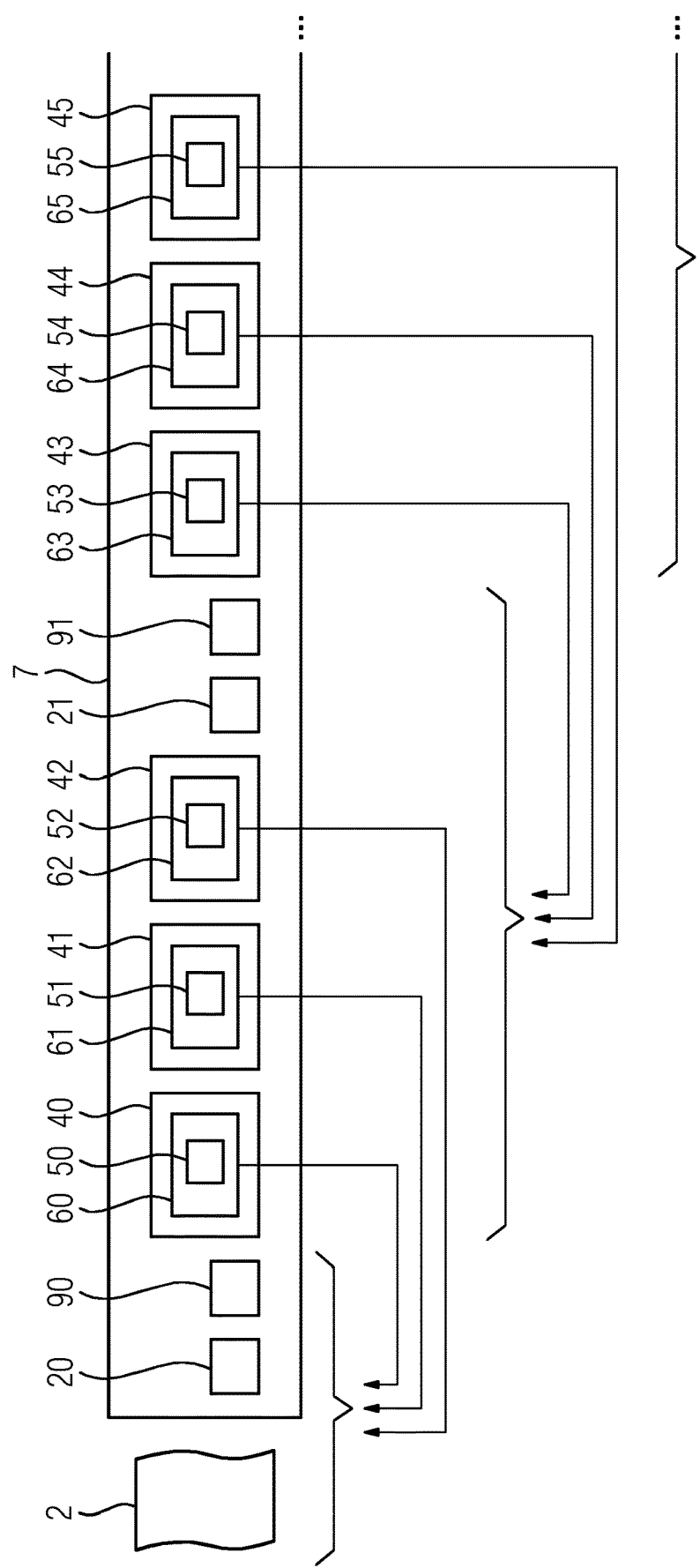
FIG. 6 shows a data structure of a cryptographic time stamp according to the second exemplary embodiment.

A second exemplary embodiment of the proposed method and the proposed time stamp apparatus is described below. FIG. 5 illustrates the performance of a method according to a second exemplary embodiment, and FIG. 6 shows a data structure of a cryptographic time stamp 7 according to the second exemplary embodiment.

The method according to the second exemplary embodiment resembles the method according to the first exemplary embodiment with the following differences:

FIG. 5 shows a total of nine time servers 80-88 with associated private keys 70-78. These are sorted into a group of first time servers 80, 81, 82, a group of second time servers 83, 84, 85 and a group of third time servers 86, 87, 88. The allocation of a respective time server to one of the groups and the order of the time servers 80-88 within the groups are randomly determined by the time stamp apparatus 1 in the method according to the second exemplary embodiment in each case using a pseudorandom generator. The affiliation of a time server 80-88 to one of the groups does not require any geographical proximity to the other time servers 80-88 in the same group, and the groups are therefore logical, rather than physical groups.

The time stamp apparatus 10 according to the second exemplary embodiment also has, in addition to the first to third units 111, 112, 113, a local timer 114 which is set up to measure a local time.

In step S1 (cf. FIG. 1), the first unit 111 of the time stamp apparatus 10 generates the nonce value 20, obtains a local time (90 in FIG. 6) from the local timer 114, concatenates the nonce value 20 with the local time (90 in FIG. 6) and the document 2 and determines the first hash value 30 according to formula VII by applying an SHA256 hash function h(x) to the result of the concatenation:

$$h_0 = h(N_0|l_0|m) \quad \text{(VII)}$$

In this case, $N_0$ is the nonce value 20, $l_0$ is the local time (90 in FIG. 6) and m is the document 2.

In step S2, the second unit 112 of the time stamp apparatus 10 selects the plurality of first time servers 80, 81, 82 and transmits the first hash value 30 to each of the first time servers 80, 81, 82. Accordingly, the unit 12 receives a respective response 40, 41, 42 from each of the first time servers 80, 81, 82. Each of the responses 40, 41, 42 comprises a digital signature 60, 61, 62 (cf. FIG. 6) of the hash value 30. According to the second exemplary embodiment, the digital signatures 60-68 are each digital signatures according to ITU-T X.509, wherein a respective digital signature 60-68 respectively comprises a time specification 50-58 as part of the respective digital signature 60-68. Furthermore, a respective digital signature 60-68 also comprises an identifier which describes the area of validity of the digital signature by specifying that it is a digital signature, the declaration of which is limited to the time specification.

The second unit 112 then generates a further nonce value 21, obtains a further local time 91 (cf. FIG. 6) from the local timer 114, concatenates the further nonce value 21 with the further local time 91 (cf. FIG. 6) and the received responses 40, 41, 42 and applies the SHA256 hash function h(x) to the result of the concatenation. The second unit 112 therefore determines a second hash value 31 according to the following formula VIII:

$$h_1 = h(N_1|l_1|\text{Sig}_{t0}(h_0)|\text{Sig}_{t1}(h_0))|\text{Sig}_{t2}(h_0))) \quad \text{(VIII)}$$

In this case, $h_1$ denotes the second hash value 31, $h_0$ denotes the first hash value 30, $N_1$ denotes the further nonce value 21, $\text{Sig}_{t0}(h_0)$ denotes a digital signature of the first hash value 30 comprising the first time specification 50, that is to say the response from the first time server 80, and $\text{Sig}_{t1}(h_0)$ and $\text{Sig}_{t2}(h_0)$ similarly denote the responses from the second time server 81 and from the third time server 82.

The time stamp apparatus 10 then selects the second time servers 83, 84, 85, transmits the hash value 31 to the respective second time servers 83, 84, 85, and receives a response 43, 44, 45 from each of the second time servers 83, 84, 85. The second unit 112 then generates yet another, that is to say a third, nonce value 22, obtains yet another, that is to say a third, local time 92 (cf. FIG. 6), and determines the third hash value 32 by applying the hash function h(x) to the result of a concatenation of the third nonce value 22, the third local time 92 (cf. FIG. 6) and the plurality of received responses 43, 44, 45. A corresponding procedure is used with the third time servers 86, 87, 88 and also, in one development, with yet further time server groups.

In step S3, the third unit 13 forms a cryptographic time stamp 7 according to the second exemplary embodiment for the digital document 2 from the plurality of nonce values 20, 21, 22, the plurality of local times 90, 91, 92 and the plurality of received responses 40-48.

FIG. 6 shows the document 2 and the cryptographic time stamp 7 and illustrates the data structure thereof. The cryptographic time stamp 7 comprises, each in a concatenated form, a nonce value 20, 21, . . . , a local time 90, 91, . . . and three responses 40-42, 43-45, . . . . Each of the responses 40-48 respectively comprises a digital signature 60-68, and each of the digital signatures 60-68 respectively comprises a time specification 50-58 as part of the digital signature 60-68.

The arrows and curly brackets in FIG. 6 illustrate the data to which the respective digital signatures 60-68 relate. Each of the first to third digital signatures 60, 61, 62 is respectively a digital signature of the first hash value 30 which was determined, according to formula VII, by applying the hash function to the document 2, the nonce value 20 and the first local time 90, which digital signature is created by a respective first time server 80, 81, 82. Each of the fourth to sixth digital signatures 63, 64, 65 is respectively a digital signature of the second hash value 30 which was determined by applying the hash function to the second nonce value 21, the second local time 91 and each of the responses 40, 41, 42 from a respective first time server 80, 81, 82, which digital signature is created by a respective second time server 83, 84, 85. A hash chain which is protected from manipulation is produced by means of the illustrated back-references of the respective digital signatures in the respective responses to the hash values in the respectively previous responses.

According to the second exemplary embodiment, each element in the hash chain forming the time stamp 7 comprises three responses from three time servers 80-82, 83-85, 86-88. In comparison with the first exemplary embodiment or a variant of the latter with eight time servers 80-88 in which each element in the hash chain contains precisely one response from one time server 80-88, however, the hash chain consists of three times fewer elements. The respective three responses can each be obtained in parallel with one another. This advantageously reduces the period of time needed to receive responses from all time servers 80-88. According to the second exemplary embodiment, a very large number of time servers 80-88 can therefore be efficiently used for the majority consensus on the time stamp 7.

According to the second exemplary embodiment, each element in the hash chain comprises a respective further nonce value. The demands imposed on the collision resistance of the hash function can be advantageously reduced further by generating a new nonce value during each run of step S2.

According to the second exemplary embodiment, each element in the hash chain forming the time stamp 7 respectively comprises a local time 90, 91, 92. Before outputting or using the time stamp 7, the time stamp apparatus 10 carries out a consistency check in which it compares the differences between the local times 90, 91, 92 of two elements in the hash chain with the differences between the time specifications 50-58 of the respective elements in the hash chain. In the example shown in FIG. 6, the time stamp apparatus 10 compares, in particular, the difference between the local time 91 and the local time 90 with a difference between the average value of the time specifications 53, 54, 55 and the average value of the time specifications 50, 51, 52. If the time servers 80-85 involved provide consistent time specifications, these differences should be substantially identical. The time stamp apparatus 10 therefore applies a second consistency criterion which states that a difference between two average values of the time specifications of two elements in the hash chain can differ from a difference between the respective local times of the corresponding elements in the hash chain by no more than a predetermined second tolerance threshold. On the basis of the second consistency criterion, the time stamp apparatus 10 determines, with a high degree of accuracy, whether the cryptographic time stamp 7 is a valid time stamp with consistent time specifications or whether at least one of the time servers 80-88 provides inconsistent time specifications and the cryptographic time stamp 7 can be used as cryptographic proof of the unreliability. A corresponding consistency check can also be carried out by an apparatus (not shown in FIG. 5) which checks the time stamp 7 at a later time.

Exemplary embodiments were described in which an infrastructure comprising a plurality of time servers 80-88 was used according to the proposed method in order to create a time stamp 3, 7 which is tamperproof, is based on a majority consensus of the plurality of time servers 80-88 and can thereby be verified without a relationship of trust with all of the time servers 80-88 involved.

Embodiments of the invention can be modified in various ways. For example, any desired number and, in particular, a very large number of time servers can be used to create the time stamp. Combinations of the exemplary embodiments are also conceivable; for example, a plurality of nonce values could likewise be generated in the first exemplary embodiment and could be used to form the time stamp 3, or the plurality of nonce values could be dispensed with in the second exemplary embodiment and only one nonce value could be used. The local times described in the second exemplary embodiment could also be used in the first exemplary embodiment.

The time stamp apparatuses according to the described exemplary embodiments and their developments and modifications can be used, in particular, to provide logs of operator decisions and/or machine contracts in a production-critical and/or safety-critical technical installation with time stamps.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for generating a cryptographic time stamp for a digital document using a plurality of time servers, comprising:
   a) generating a nonce value and determining a current hash value by applying a predetermined hash function to the nonce value and to the digital document;
   b) repeatedly carrying out the following steps:
      b1) selecting one of the plurality of time servers,
      b2) transmitting the current hash value to the selected time server,
      b3) receiving a response which is created by the selected time server and comprises a digital signature of the current hash value and a time specification,
      b4) determining a further hash value by applying the predetermined hash function to the received response, and
      b5) using the further hash value as the current hash value; and
   c) forming the cryptographic time stamp for the digital document from the nonce value and a plurality of received responses,
   wherein,
      in each step b4), the determination of the further hash value comprises generating a further nonce value and is carried out by applying the predetermined hash function to the further nonce value and to the received response,
   in step c), the cryptographic time stamp for the digital document is formed from a plurality of nonce values and the plurality of received responses, and
   the cryptographic time stamp comprises a sequence of the plurality of nonce values, of a plurality of received digital signatures and of a plurality of received time specifications.

2. The method as claimed in claim 1,
   wherein the digital signature comprises the time specification and/or is formed by signing the current hash value and the time specification.

3. The method as claimed in claim 1, wherein the cryptographic time stamp comprises the nonce value and a sequence of a plurality of received digital signatures and of a plurality of received time specifications.

4. The method as claimed in claim 1, wherein
   identifying a time server as unreliable if the time specification included in the response created by the time server does not satisfy a predefined consistency criterion.

5. The method as claimed in claim 4, wherein the predetermined consistency criterion comprises a condition that a temporal sequence of respective time specifications corresponds to a sequence of the respective selection of corresponding time servers and/or corresponds to a sequence of the respective time specifications in the cryptographic time stamp.

6. The method as claimed in claim 4, wherein the predetermined consistency criterion comprises a condition that the time specification does not differ from at least one of a plurality of time specifications by more than a predetermined first tolerance threshold.

7. The method as claimed in claim 4, wherein
   measuring a local time before a respective step b4),
   determining the further hash value in the respective step b4) by applying the predetermined hash function to the received response and to the measured local time,
   also forming the cryptographic time stamp in step c) from the local times measured in steps b4),
   wherein the cryptographic time stamp comprises the nonce value and a sequence of a plurality of received digital signatures, of a plurality of received time specifications and of a plurality of measured local times, and
   the predetermined consistency criterion comprises a condition that a difference between two of the time specifications in each case does not differ from a difference between the corresponding two of the measured local times by more than a predetermined second tolerance threshold.

8. The method as claimed in claim 1, wherein
   d) checking time specifications included in the cryptographic time stamp formed in step c) using a predefined consistency criterion;
   e) using the cryptographic time stamp as a trustworthy cryptographic time stamp for the digital document if all of time specifications satisfy the predefined consistency criterion, or f) using the cryptographic time stamp as proof of unreliability of at least one of the selected time servers if at least one of the time specifications does not satisfy the predefined consistency criterion.

9. The method as claimed in claim 1, wherein one of the plurality of time servers is selected in the respective steps b1) according to a predefined order or randomly.

10. The method as claimed in claim 1, wherein
selecting a plurality of the plurality of time servers in step b1),
transmitting the current hash value to each of a plurality of selected time servers in step b2),
receiving a respective response from each of the selected time servers in step b3), which the response respectively comprises the digital signature of the current hash value and the time specification, and
determining the further hash value in step b4) by applying the predetermined hash function to the received responses from the plurality of selected time servers.

11. The method as claimed in claim 1, wherein, in a respective step b3), the response also comprises an identifier describing an area of validity of the digital signature, and the digital signature is a digital signature of a combination of the current hash value and the identifier describing the area of validity of the digital signature,
wherein the cryptographic time stamp comprises the nonce value and a sequence of a plurality of received digital signatures, of a plurality of received time specifications and of a plurality of received identifiers.

12. A computer program product, comprising a computer readable hardware storage device having a computer readable program code stored therein, said computer readable program code executable by a processor of a computer system to implement a method which causes the method as claimed in claim 1 to be carried out on a program-controlled device.

13. An apparatus for generating a cryptographic time stamp for a digital document using a plurality of time servers, comprising
a) a first unit for generating a nonce value and for determining a current hash value by applying a predetermined hash function to the nonce value and to the digital document;
b) a second unit for repeatedly carrying out the following steps:
b1) selecting one of the plurality of time servers,
b2) transmitting the current hash value to the selected time server,
b3) receiving a response which is created by the selected time server and comprises a digital signature of the current hash value and a time specification,
b4) determining a further hash value by applying the predetermined hash function to the received response, and
b5) using the further hash value as the current hash value; and
c) a third unit for forming the cryptographic time stamp for the digital document from the nonce value and a plurality of received responses;
wherein the second unit is configured such that, in each step b4), the determination of the further hash value comprises generating a further nonce value and is carried out by applying the predetermined hash function to the further nonce value and to the received response,
wherein the third unit is configured such that, in step c), the cryptographic time stamp for the digital document is formed from a plurality of nonce values and the plurality of received responses, and
wherein the cryptographic time stamp comprises a sequence of the plurality of nonce values, of a plurality of received digital signatures and of a plurality of received time specifications.

14. An apparatus for logging operator decisions and/or machine decisions, wherein the apparatus comprises a processor configured to provide digital documents with cryptographic time stamps generated by
a) generating a nonce value and determining a current hash value by applying a predetermined hash function to the nonce value and to the digital document;
b) repeatedly carrying out the following steps:
b1) selecting one of the plurality of time servers,
b2) transmitting the current hash value to the selected time server,
b3) receiving a response which is created by the selected time server and comprises a digital signature of the current hash value and a time specification,
b4) determining a further hash value by applying the predetermined hash function to the received response, and
b5) using the further hash value as the current hash value; and
c) forming the cryptographic time stamp for the digital document from the nonce value and a plurality of received responses,
wherein,
in each step b4), the determination of the further hash value comprises generating a further nonce value and is carried out by applying the predetermined hash function to the further nonce value and to the received response,
in step c), the cryptographic time stamp for the digital document is formed from a plurality of nonce values and the plurality of received responses, and
the cryptographic time stamp comprises a sequence of the plurality of nonce values, of a plurality of received digital signatures and of a plurality of received time specifications, further wherein the digital documents comprise logs of the operator decisions and/or the machine contracts.

* * * * *